Sept. 5, 1944. P. B. RICHARDSON 2,357,766
WEIGHING APPARATUS
Filed April 28, 1942 6 Sheets-Sheet 1
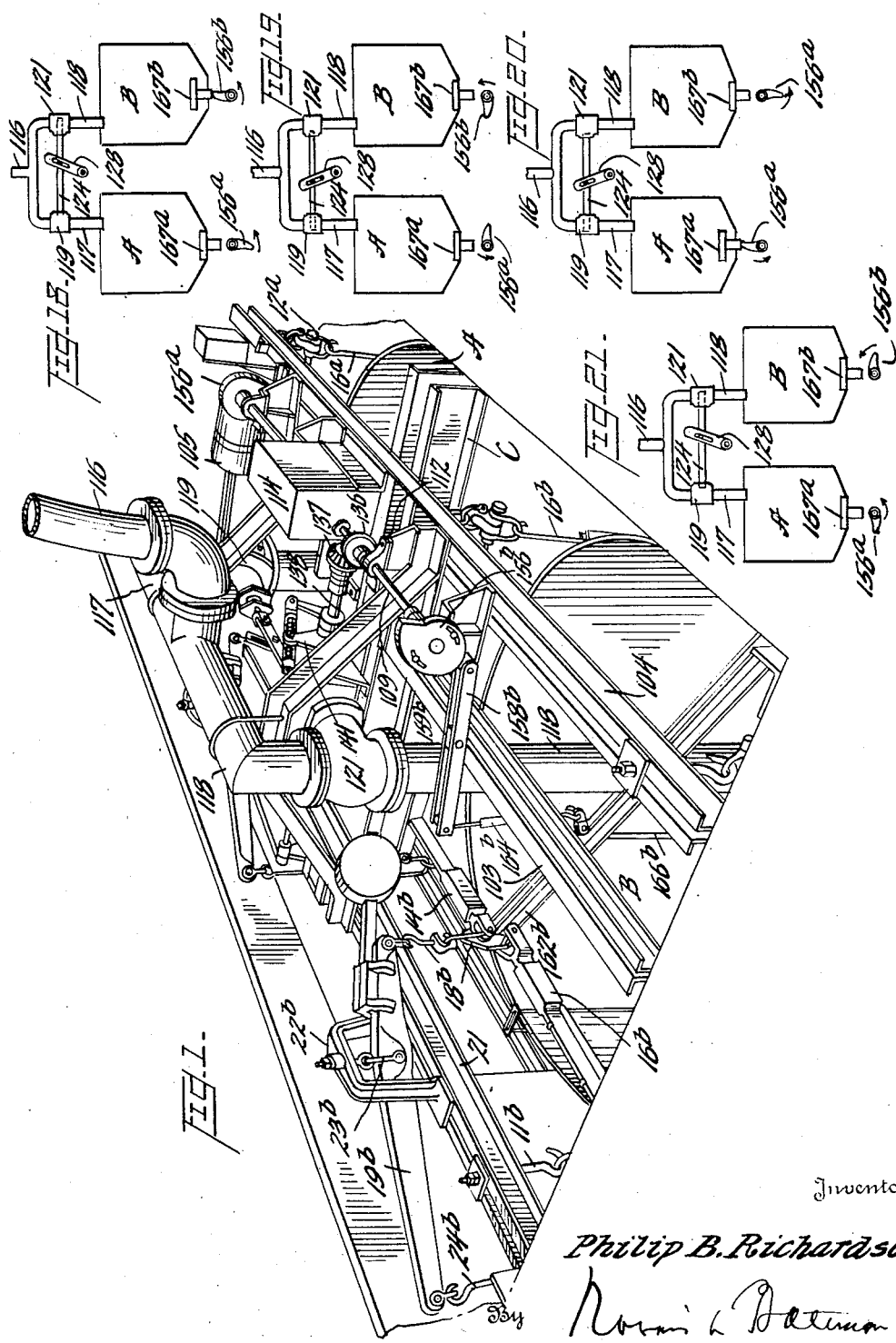
Inventor
Philip B. Richardson
By
Attorneys

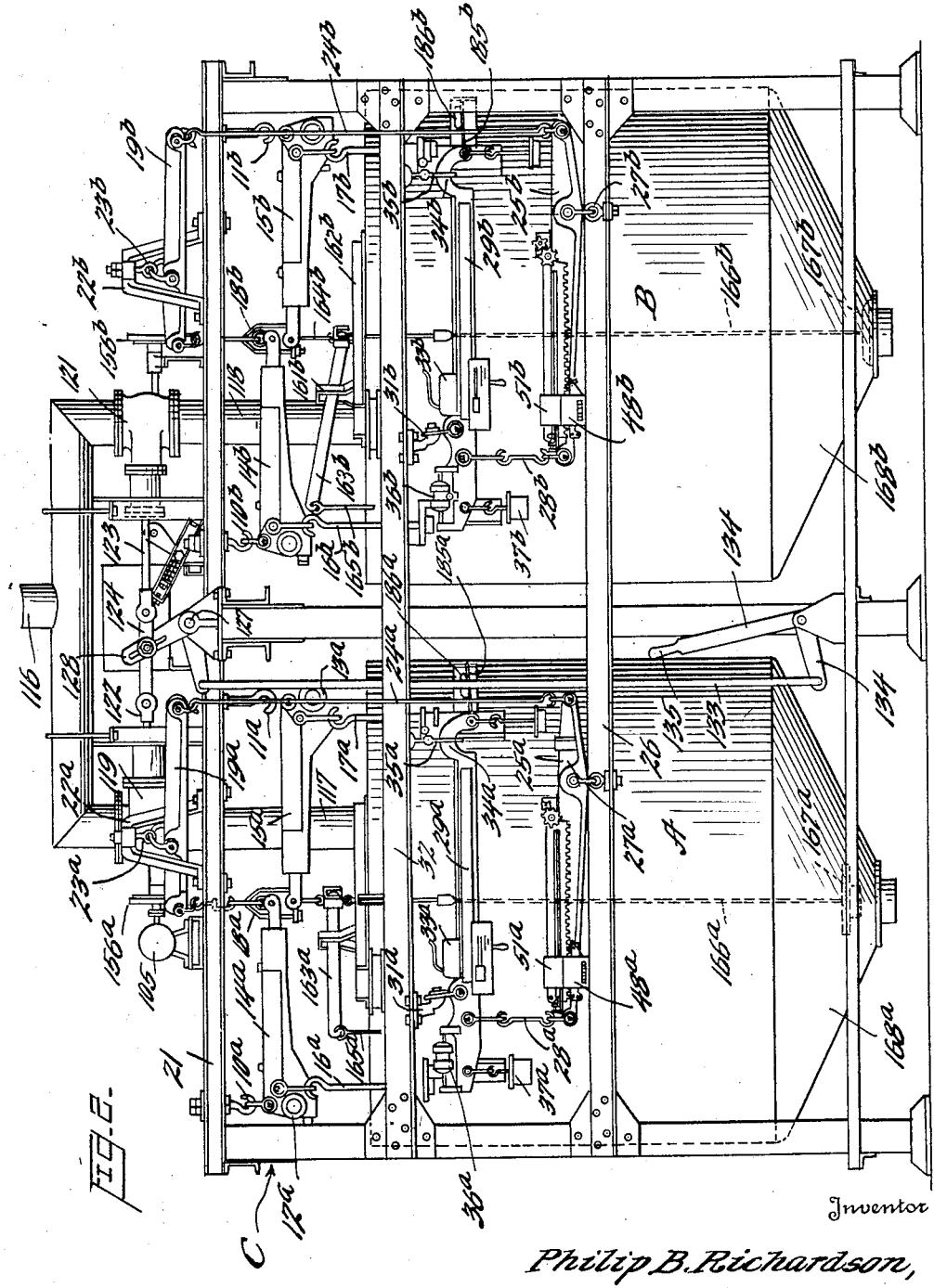

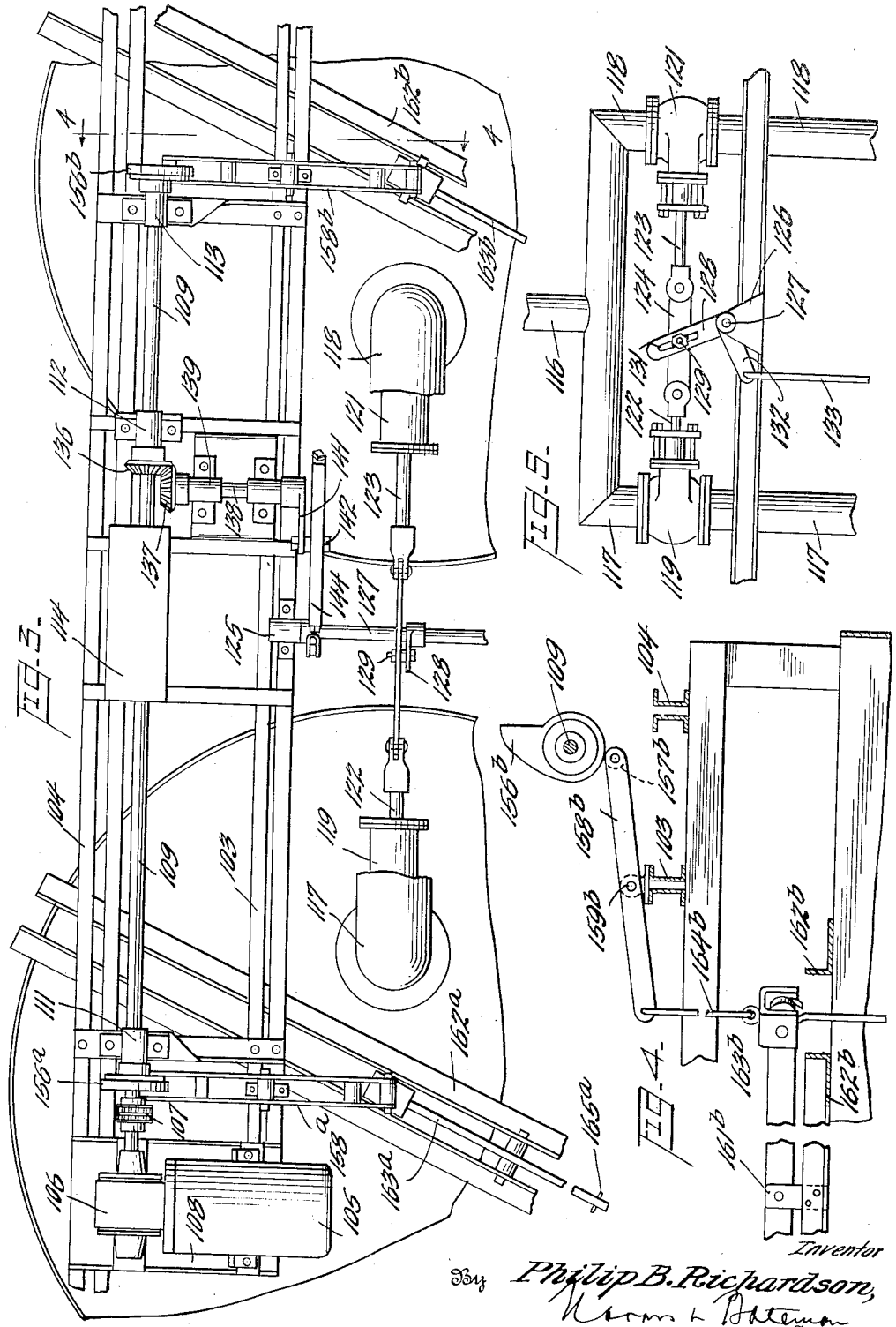

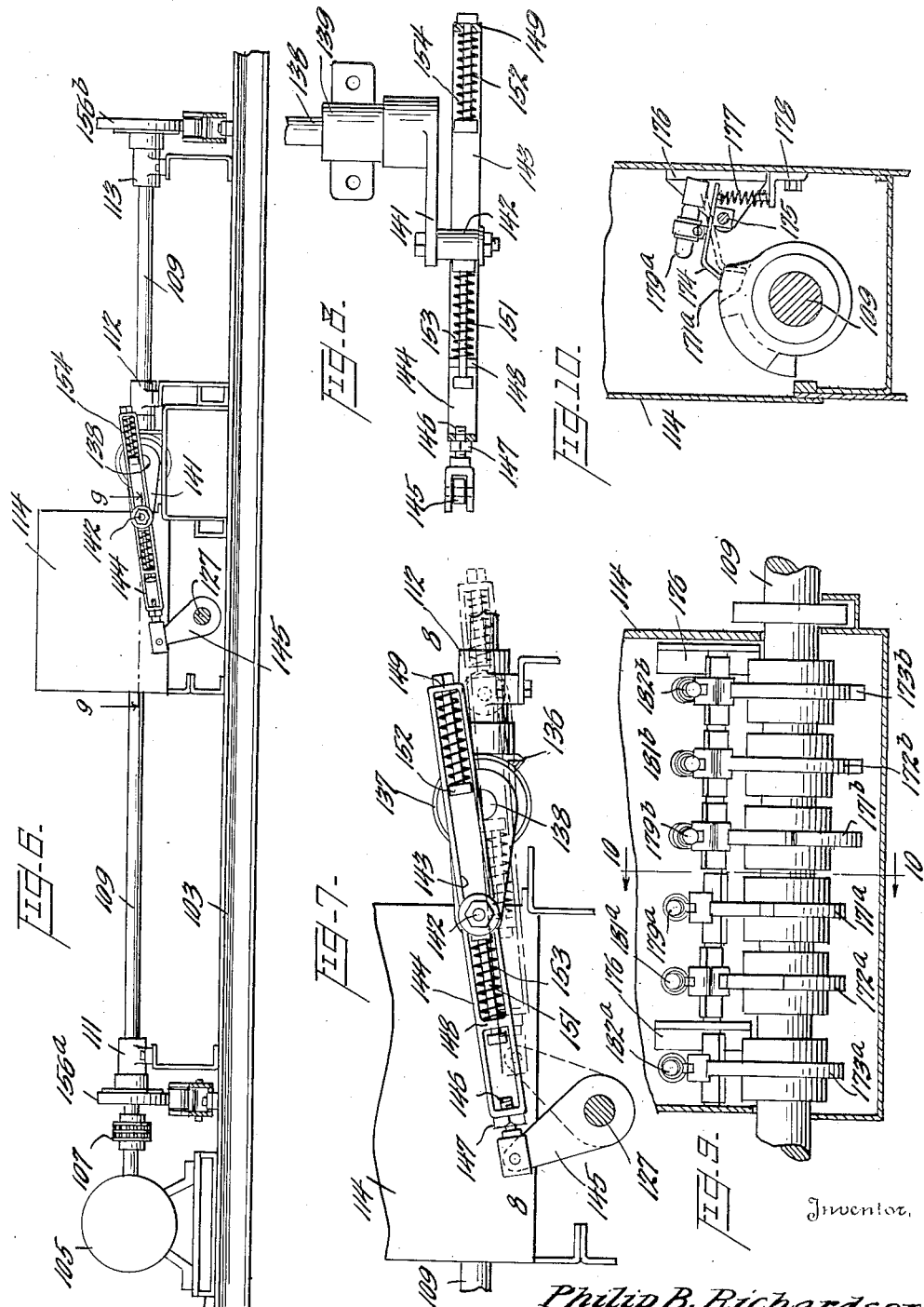

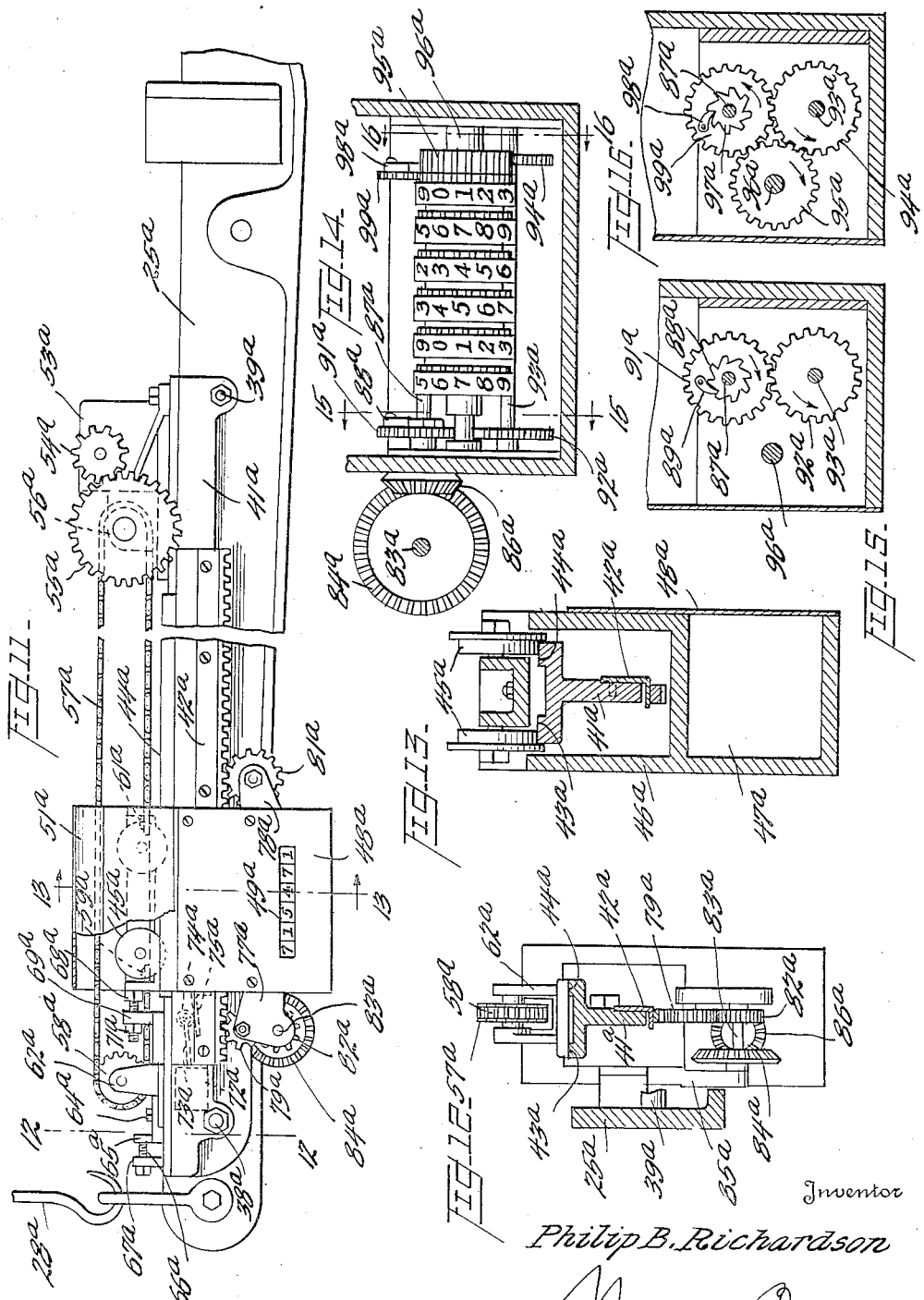

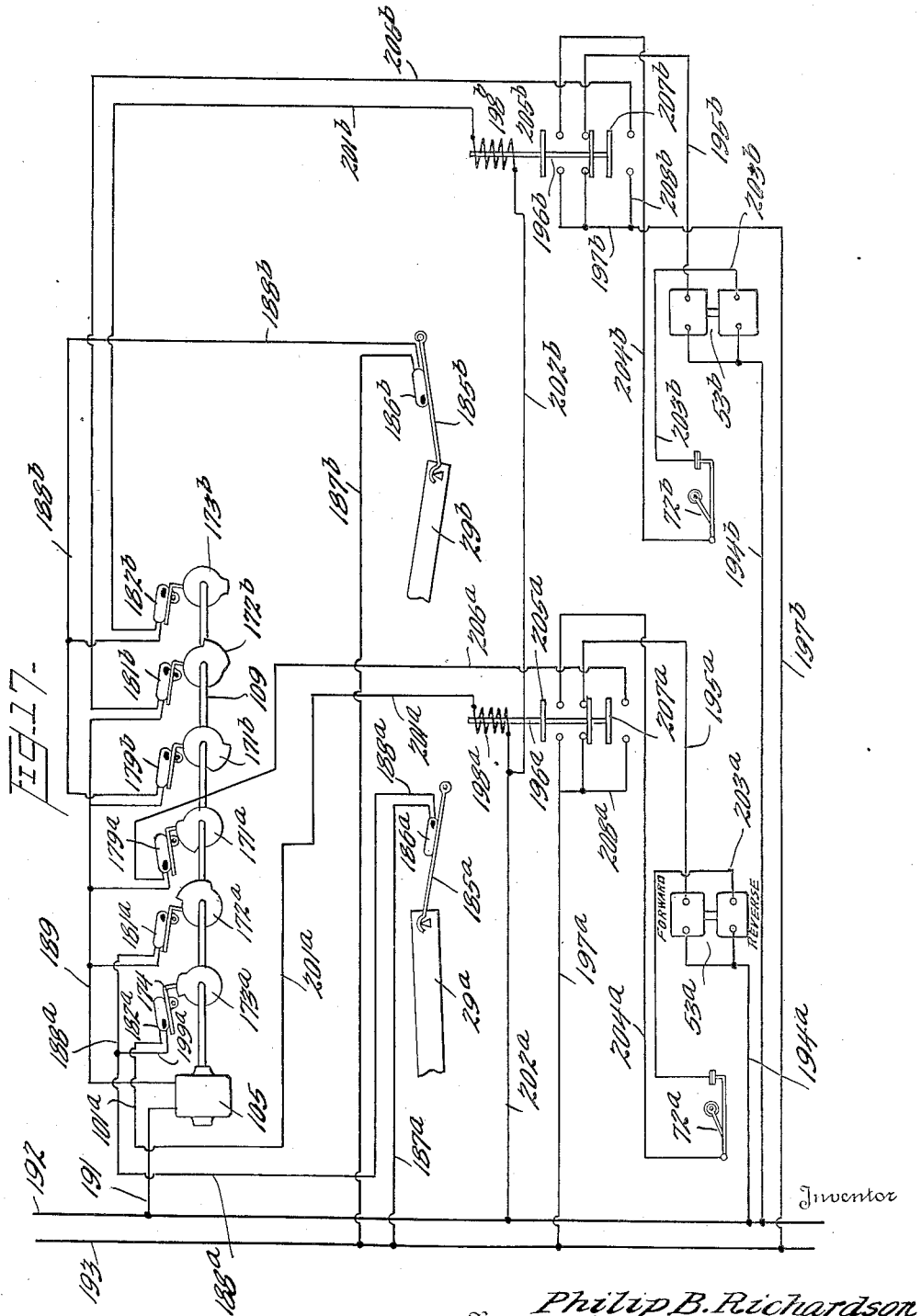

Patented Sept. 5, 1944

2,357,766

UNITED STATES PATENT OFFICE 2,357,766

WEIGHING APPARATUS

Philip B. Richardson, Montclair, N. J., assignor to Richardson Scale Company, Clifton, N. J., a corporation of New Jersey Application April 28, 1942, Serial No. 440,849

9 Claims. (Cl. 249—26)

The present invention relates to weighing apparatus, and more particularly to apparatus for weighing liquids, although it is not limited to such use and may be advantageously employed to weigh grain and other solid fluent, solid or semi-solid materials.

The major object of this invention is to provide a novel automatic machine embodying two alternately operating tanks which will accurately weigh the liquid and yet which collectively provide a substantially continuous flow of liquid from a supply station to a delivery station.

A further important object is to provide a weighing apparatus which will automatically shut off the liquid flow when a quantity slightly in excess of a predetermined weight is charged into the tank, will accurately weigh the overdraft, and then discharge the contents.

A further object is to provide a weighing apparatus embodying a novel cam shaft assembly for controlling the inlet and outlet valves of a multi-tank assembly, and for also controlling electric circuits, to effect a series of operations in a predetermined cycle.

Another object is to provide a weighing apparatus with an automatically traveling poise embodying a registering mechanism which will measure one half of the weight on the way out and one half on the way back.

A further object is to provide a double-tank weighing apparatus with means for converting it into a completely automatic machine in which the filling, weighing and discharging operations are caused to occur, for each tank alternately, in accurately predetermined sequence, means being provided for: closing the inlet valve of one tank and simultaneously opening the other inlet valve when the tank receives a predetermined weight of material; opening the discharge valve when the overdraft has been measured; redirecting the flow of material back into the first tank when a predetermined weight of material is fed into the second tank; weighing the excess material; and then discharging it, the cycle being repeated over and over without any attention of an operator.

Further objects will become apparent as the specification proceeds in conjunction with the annexed drawings, and from the appended claims.

In the drawings,

Figure 1 is a perspective view of a weighing apparatus embodying my invention;

Figure 2 is a front view of the machine of Figure 1;

Figure 3 is a top plan view illustrating the cam shaft, cycle controller and inlet and dump valve mechanism;

Figure 4 is a fragmental sectional view taken substantially along the line 4—4 of Figure 3, looking in the direction of the arrows;

Figure 5 is a fragmental view illustrating the inlet valve assembly and operating mechanism, and shows the parts as they appear when viewed from the bottom of Figure 3;

Figure 6 is a front elevational view on an enlarged scale of the cam shaft, cycle controller and inlet and outlet valve operating mechanism;

Figure 7 is an enlarged view of the spring loaded lost-motion link and crank assembly for operating the inlet valves;

Figure 8 is a top plan view of the assembly of Figure 7;

Figure 9 is a sectional view through the cycle controller, taken substantially on the line 9—9 of Figure 6;

Figure 10 is a sectional view taken on the line 10—10 of Figure 9;

Figure 11 is a front elevational view of one of the auxiliary weigh beams, showing the traveling poise and its actuating mechanism;

Figure 12 is a sectional view taken on the line 12—12 of Figure 11;

Figure 13 is a sectional view taken on the line 13—13 of Figure 11;

Figure 14 is a front view of the lower part of the poise of Figure 11, with the cover plate removed;

Figure 15 is a sectional view taken on the line 15—15 of Figure 14, showing the overdraft recording mechanism associated with the auxiliary poise;

Figure 16 is a sectional view taken on the line 16—16 of Figure 14;

Figure 17 is a diagrammatic view of the electrical circuit for the apparatus of the invention;

Figure 18 is a diagrammatic view showing the relationship between the valves of the weigh tanks when tank A is filling and tank B is discharging;

Figure 19 shows the positions assumed by the parts when the overdraft in tank A is being weighed and tank B is filling;

Figure 20 shows the relationship when tank A is discharging and tank B is filling; and, Figure 21 shows the condition when tank A is filling and the overdraft in tank B is being weighed.

With continued reference to the drawings, in which like reference characters have been employed to designate like parts throughout the several views, the weighing tanks for the liquid are designated A and B, and reference characters with the subscript *a* or *b* are used to denote corresponding parts associated with the two tanks, to facilitate an understanding of the invention.

Tank assembly

Tanks A and B are supported on a frame C of any suitable construction by pairs of hook members 10a, and 11a, which, through clevices, support shafts 12a and 13a, carrying levers 14a and 15a, respectively. Tank A is supported by pairs of hooks 16a and 17a connected to shafts 12a and 13a, respectively. Tank B is similarly supported.

Pivotally connected to the inner ends of levers 14a and 15a, by means of a shackle and swivel assembly 18a, is the inner end of a lever 19a, supported on front longitudinal frame member 21 by means of a yoke 22a and a shackle 23a.

Weighing mechanism

Since the weighing mechanisms for the two tanks are identical, only the one associated with tank A will be described in detail.

Pivotally connected to lever 19a, by means of a link 24a, is a lever 25a, which is pivoted on a front longitudinal frame member 26 by means of a shackle 27a. The novel auxiliary traveling poise of the invention is supported upon lever 25a in a manner to be hereinafter pointed out. Pivotally connected to lever 25a, by means of a shackle assembly 28a, is a main scale beam 29a, which is pivotally supported on a bracket 31a carried by a front longitudinal frame member 32. Beam 29a is provided with a poise 33a, a goose neck 34a, a trig loop 35a and compensating masses 36a and 37a, all in well known manner.

From the foregoing, it is apparent that lever 25a and beam 29a will directly respond to the weight of liquid contained in tank A, and that by adjusting poise 33a the exact weight of liquid in the tank may be accurately determined. However, by providing a novel auxiliary poise and valve actuating means, to be hereinafter described, it is possible to bring about a completely automatic functioning of the apparatus, which comprises setting the main scale poise to a fixed "operating" position, feeding in a quantity of liquid sufficient to slightly over-balance the poise, and then automatically actuating the auxiliary poise to measure the overdraft, the total main beam depressions and the total overdrafts being added together to give the total liquid weighed over any period of operation. A counter or the like (not shown) actuated by the main beam records the number of beam depressions.

The traveling or auxiliary poise is shown more clearly in Figures 11 to 16, inclusive. Rigidly secured to lever 25a, by means of bolt and nut assemblies 38a and 39a, is a beam member 41a, carrying a rack 42a. As seen in Figure 13, beam member 41a is of T-shape section, providing parallel tracks 43a and 44a for the flanged wheels 45a of a hollow poise body 46a, having a lower compartment 47a closed by a plate 48a having a dial reading opening 49a. Preferably, the wheels are protected by a cover 51a fitting down over the poise body, and having openings in its ends to clear the track and the sprocket chain.

The traveling poise is adapted to be moved outwardly and inwardly on the beam by means of an electric motor 53a, a drive pinion 54a, a gear 55a, a driving sprocket 56a, and a sprocket chain 57a. One end of the chain passes over an idle sprocket 58a, and is secured to a pin 59a within the poise body, while the other end is secured to a second pin 61a in the poise body. The forward and reverse circuits of motor 61a are automatically controlled in a manner to balance the overdraft and then return to zero, as will hereinafter be pointed out.

The idle sprocket is carried by a bracket 62a, which is guided for longitudinal movement in a guideway portion of member 41a, as seen in Figure 13, and clamped in adjusted position by means of a pair of cap screws 64a. Threaded into a lug 67a on member 41a is a screw 66a, which engages a lug 65a on bracket 62a. By loosening screws 64a and turning the screw 66a, the idle sprocket may be adjusted to compensate for sprocket chain wear.

A second screw 68a, threaded into a lug 69a and locked by a nut 71a, is adapted to be abutted by the poise in zero position, and by adjusting the screw the zero position may be varied at will. Also, carried by member 41a is a limit switch 72a having an arm 73a carrying a roller 74a coacting with a cam 75a projecting from the poise. In the position of the parts shown (in Figure 11) with the poise in zero position, and with arm 73a raised, the switch is open. As will be pointed out hereinafter, cam 75a opens the switch on the return movement of the poise motor and breaks the poise motor circuit, bringing the poise to rest. If desired, a solenoid-operated positive or friction brake may be associated with the motor to quickly bring the parts to rest when the circuit is opened.

The novel counter associated with the traveling poise will now be described. Journaled in brackets 77a and 78a carried by the poise, and constantly meshing with rack 42a, is a drive pinion 79a and an idle pinion 81a. The two pinions, in combination with the four flanged trolley wheels, keep the poise accurately aligned with the beam at all times, irrespective of the distribution of mass in the poise. Pinion 79a drives a counter mechanism which, preferably, reads directly in pounds, through a novel drive which is so constructed as to record or count one half the overdraft when the poise moves out, and the other half when the poise returns.

To this end, drive pinion 79a meshes with a gear 82a carried on a shaft 83a which, also, carries a bevel gear 84a, and is journaled in a bracket 85a on the poise. Bevel gear 84a meshes with a bevel pinion 86a carried by a shaft 87a in the lower compartment 47a of the poise.

As seen in Figures 14 and 15, shaft 87a carries a ratchet 88a adapted to be engaged by a spring pressed pawl 89a carried by a gear 91a loosely mounted on shaft 87a. Gear 91a constantly meshes with a gear 92a rigidly mounted on a bottom shaft 93a. As seen in Figure 16, bottom shaft 93a, also, rigidly carries a gear 94a which constantly meshes with a gear 95a carried by a counter train actuating shaft 96a. A second ratchet 97a on shaft 87a is adapted to be engaged by a pawl 98a carried by a gear 99a loosely mounted on shaft 87a, it being noted that the ratchets 88a and 98a have oppositely facing teeth, and that gear 99a meshes with gear 95a, but is out of mesh with gear 94a (Figure 14).

Taking up the operation, and assuming that the poise is traveling out on the beam, bevel gear 84a rotates clockwise in Figure 14, and shaft 87a rotates as indicated in Figure 15, and through ratchet 88a and pawl 89a rotating gears 91a and 92a in the directions indicated. Shaft 93a rotates counterclockwise and through gear 94a rotates counter train gear 95a and shaft 96a in a clockwise direction. Pawl 98a merely idles over the teeth of ratchet 97a during this operation.

When the poise is returning to zero, shaft 87a rotates counterclockwise, as seen in Figure 16, and through ratchet 97a and pawl 98a rotates gear 99a in a similar direction. The latter, accordingly, rotates counter train actuating shaft 96a and gear 95a in a clockwise direction. Pawl 89a merely idles over the teeth of ratchet 88a during this operation.

It is, accordingly, apparent that the counter train will always be advanced irrespective of the direction of poise travel, and that by properly proportioning the gear ratios, the counter train can be made to indicate pounds or any other desired unit of weight measure. It is also to be understood that, if desired, an instantaneous weight reading dial, geared at a two-to-one ratio, with respect to the counter train, may also be used to give the amount of the overdraft at the exact point of balance, i. e., the point at which the direction of poise travel is reversed.

Valve operating mechanism

The inlet and discharge valves for the two weighing tanks are operated in predetermined sequence by a cam shaft, which, as will be later pointed out, also operates the cycle controller for the entire system.

Referring to Figures 1 and 3 to 8, inclusive, the frame is provided with a pair of top longitudinals 103 and 104 upon which most of the valve operating mechanism is mounted. An electric motor 105, having a speed reducing head 106 and a flexible coupling 107, is mounted on a base plate 108 carried by members 103 and 104 at one end of the apparatus. Connected to coupling 107 is a shaft 109, journaled in bearings 111, 112 and 113, and passing through a cycle box 114, containing the switches for controlling the various circuits.

Taking up first the operation of the inlet valves, the liquid is fed to the apparatus by way of a pipe 116 having a branch 117 extending down into tank A, and a branch 118 extending into tank B. Branches 117 and 118 are provided with gate valves 119 and 121, having operating stems 122 and 123, respectively. The valve stems are connected together by a link 124 and the arrangement is such that when one valve is open the other valve is closed. Journaled on brackets 125 and 126 on the frame is a shaft 127 carrying a lever 128, which is connected to valve operating link 124 by means of a pin 129 and a slot 131. Also, secured to shaft 127 is a lever 132 located near the front of the apparatus and connected to a link 133. Pivoted on a bracket at the front of the frame, and connected to link 133 is a bell crank lever 134 having a hand operating portion 135.

From the foregoing description, it is apparent that by rocking lever 134 to the left, as shown in Figure 1, valve 119 is closed and valve 121 is opened, and that by rocking the lever to the right, valve 119 will be opened and valve 121 closed. I have also provided automatic means for rocking shaft 127 to open and close the valves in predetermined sequence, which will now be described.

Mounted on shaft 109 is a bevel gear 136 meshing with an equal pitch bevel gear 137 carried by a shaft 138 mounted in bearings 139 on the frame. Carried on the other end of shaft 138 is a crank 141, carrying a crank pin assembly 142 which rides in a slot 143 in a special spring or "lost-motion" link 144 (Figure 8). The latter is pivotally connected to a lever 145, carried by shaft 127, so that upon each reciprocation of link 144, valves 119 and 121 will be opened and closed, and in order to secure proper adjustment of the valve action link 144 is threaded onto a bolt 146, having a lock nut 147 for securing the parts in place.

By means of the novel spring plunger assembly coacting with crank pin 143, actuation of the valves is effected through approximately ninety degrees of travel of shafts 109 and 138, and in the following ninety degrees of travel they remain stationary. Guided in apertured lugs 148 and 149 in link 144 are a pair of plungers 151 and 152, urged toward pin 142 by means of springs 153 and 154, respectively. As seen in Figure 8, heads on the plungers limit the action of springs 153 and 154, and the plungers are also provided with enlarged heads coacting with pin 142.

With the parts in the positions shown in Figures 6, 7 and 8, pin 142, coacting through plunger 151 and spring 153, has rocked lever 145 into its extreme left hand position, which causes lever 128 and link 124 to assume the positions shown in Figure 5, thereby closing valve 119 and opening valve 121. As seen in Figures 7 and 8, shaft 138 has rotated slightly beyond valve-operating position, and beyond dead center, so as to compress spring 153 and move the head of plunger 151 away from lug 148. As seen, spring 153 is still slightly compressed, in view of the clearance between the head of plunger 151 and lug 148. Further rotation of crank 141 counterclockwise in Figure 7, though approximately ninety degrees, merely causes pin 142 to idly move in slot 143 toward plunger 152, without effecting valve actuation. Upon contact of crank pin 142 with plunger 152, in response to further rotation, the plunger and spring cause link 144 to move to the right into the dotted line position shown in Figure 7, thereby rocking lever 145 and shaft 127 and opening valve 119 and closing valve 121. After the valves have been actuated, as just described, further rotation of shaft 109 merely displaces plunger 152 to the right against the action of spring 154, and further rotation through approximately ninety degrees causes pin 142 to idle in slot 143 toward plunger 151.

Accordingly, by reason of the novel mechanism just described, each valve is opened and closed during each full rotation of crank 141 and shaft 109, but the action is comparatively rapid, occurring through two equal working strokes of approximately ninety degrees, the remainder of the three hundred sixty degrees travel being taken up by two idle strokes of approximately ninety degrees each.

The discharge or dump valve operating mechanism is also controlled by shaft 109, and it will now be described. Secured to opposite ends of shaft 109 are cams 156a and 156b, located one hundred eighty degrees out of phase. Taking up the operating mechanism for the discharge valve of tank B, which is identically similar to the one for tank A, and referring to Figure 4, cam 156b coacts with a roller 157b carried by a lever 158b pivoted on a bracket 159b on frame member 103. Pivoted on a bracket 161b on cross members 162b carried by tank B is a lever 163b which is connected to lever 158b by a link 164b.

Connected to the outer end of lever 163b is a link 165b by which the lever may be manually rocked to open the discharge valve.

Connected to the inner end of lever 163b is a vertical rod 166b, connected at its lower end to a dump or discharge valve 167b, located over a discharge opening in a hopper-like bottom 168b of the tank. The valve and operating mechanism for tank A is similarly constructed, and will not be further described.

With the parts in the positions shown in Figure 4, valve 167a is open and valve 167b is closed. When shaft 109 is rotated ninety degrees from the position shown in Figure 4, in the direction indicated, cam 156a will rock lever 158a and close valve 167a. Rotating shaft 109 through an additional ninety degrees will cause cam 156b to open valve 167b, it being understood that rotation of the shaft occurs in progressive ninety degrees steps, to effect the various stages of operation in predetermined sequence, as indicated in Figures 18 to 21, inclusive.

With cam 156a in the position shown in Figure 4, inlet valve operating shaft 127 is disposed in the position shown in Figures 5, 7 and 8, with the result that under the condition illustrated inlet valve A is closed, tank A is discharging through open valve 167a, while the inlet valve in tank B is open and the discharge valve closed. This condition is also diagrammatically shown in Figure 20.

The cam operated switches for controlling the operating phases are located in cycle controller box 114 and, preferably, are of the mercury type. Referring to Figures 9 and 10, shaft 109 carries cams 171a, 172a, 173a, 171b, 172b and 173b, located within box 114 and coacting with cam followers 174. The latter are pivoted on a shaft 175 carried by brackets 176 secured to the rear wall of box 114 and are constantly urged into contact with the cams by springs 177 reacting against a spring footing member 178, also carried by the rear wall of box 114. Followers 174 carry mercury switches 179a, 181a, 182a, 179b, 181b and 182b. As shaft 109 is rotated step-by-step, the switches make and break the various circuits to effect a fully automatic operation of the apparatus, as will now be described.

Referring to Figure 17, and assuming that tank B is draining (valve 167b open) and tank A is filling (valve 119 open), as indicated in Figure 18, when the weight of liquid in tank A exceeds a predetermined operation point, (say 8,000 pounds as indicated by poise 33a) beam 29a rises, and through a link 185, hooked over the beam end and carrying a mercury switch 186a, closes a circuit through cam shaft motor 105 through lines 187a and 188a, switch 181a (held in closed position by cam 172a) and lines 189 and 191, the supply current mains being designated 192 and 193. Motor 105, accordingly, rotates shaft 109 until cam 172a opens switch 181a and breaks the motor circuit. Rotation of shaft 109, as just described, approximately through ninety degrees, causes shaft 127 to close valve 119 and open valve 121, thereby cutting off the feed to tank A and opening the feed to tank B, and also causes cam 156b to close valve 167b.

The positions of the parts assumed under the condition just described is shown in Figures 17 and 19, and tank B is filling while tank A contains an overdraft somewhat in excess of the 8,000 pounds indicated by the main beam poise. This overdraft is automatically determined by the traveling poise assembly, as follows:

Just before switch 181a breaks, as just described, cam 173a closes switch 182a, which closes the forward circuit of the poise motor 53a through lines 194a and 195a, a solenoid actuated holding switch 196a and a line 197a. The solenoid 198a is in series with beam switch 186a and switch 182a, with the result that with beam 29a in the raised position and switch 182a closed, as shown in Figure 17, the solenoid circuit is closed through line 187a, switch 186a, line 188a, switch 182a, lines 101a and 201a, the solenoid winding, and line 202a. This is known as the starting circuit.

With the circuit of motor 53a closed, as just described, the motor, through chain 57a, causes the traveling poise to run out on the auxiliary beam. As soon as the poise leaves zero position, cam 75a allows arm 73a to drop, closing switch 72a, which completes the reverse circuit, as will now be described.

When the poise travels out far enough, it balances the overdraft in tank A, bringing the beam system into equilibrium, and causing the main beam 29a to descend and break switch 186a. This opens the starting circuit, previously described, and de-energizes solenoid 198a, allowing the contact arms to drop and open the poise motor circuit, and close the reverse circuit through line 194a, the reverse winding; line 203a; switch 72a, line 204a; contact bar 205a; and line 197a. Simultaneously, a second circuit is established through motor 105 by way of lines 191 and 189; switch 179a, line 206a, contact bar 207a and lines 208a and 197a, with the result that while the traveling poise is returning to zero, motor 105 rotates the cam shaft through ninety degrees to open the discharge valve of tank A, as indicated in Figure 20, the cam motor circuit being broken as soon as cam 171a passes beyond its follower. Upon reaching zero position, switch 72a opens and stops the poise motor.

The poise motor is so designed that it will return sufficiently slowly to zero position to allow the valve 167a to open and discharge the overdraft before the poise has moved back sufficiently to let the main beam rise again, to thereby prevent the poise from stopping in mid-beam position and then coming forward again.

With the parts in the positions just described, with shaft 109 stopped with the leading edge of cam 171b under its follower, and with tank A draining and tank B filling, as shown in Figure 20, the filling operation continues until the liquid in tank B exceeds the operation point (8,000 pounds—that same as for tank B) causing the main beam 29b to rise, closing switch 186b, in series with switch 179b and cam shaft-operating motor 105. The circuit through the latter is closed by way of line 187b, switch 186b, line 188b, switch 179b and lines 189 and 191. The cam shaft is, accordingly, rotated ninety degrees until cam 171b opens switch 179b. Rotation of cam shaft 109, through crank 141 and shaft 127, as just described, closes valve 121 and opens valve 119, cutting off the feed to tank B and initiating feed to tank A, discharge valve 167 being closed slightly in advance of the opening of valve 119. This relationship of the parts is shown in Figure 21.

Just before switch 179a opens, cam 173b closes switch 182b, closing the starter circuit for the poise motor 53b through line 187b; switch 186b; line 188b; switch 182b; line 201b; the winding of solenoid 198b; and lines 202b and 202a. Motor 53b causes poise 48b to travel out on beam 25b, closing switch 72b as it leaves zero, and upon bringing the beam system into equilibrium causes main beam 29b to descend, breaking switch 186b, opening the starter circuit for solenoid 198b and allowing the contact bars to drop down.

Opening the starting circuit causes the poise to return to zero, and also effects opening the discharge valve to tank B, as follows: The reverse circuit for poise motor 53b is closed through line 194b; the reverse winding; line 203b, switch 72b; line 204b; contact bar 205b; and line 197b. Simultaneously, the contact bar establishes a circuit through cam shaft motor 105 by way of lines 191 and 189, switch 181b; line 206b; bar 207b; line 208b; and line 197b, causing shaft 109 to rotate through approximately ninety degrees and open discharge valve 167b. As soon as cam 172b passes under its follower and opens switch 181b, the parts are in the positions shown in Figure 18, the starting position, with the result that the entire operating cycle has been completed, and the apparatus is in condition to have the operation repeated.

While cams 173a and 173b have been shown as having a thirty degree operating face, and cams 172a, 171a, 171b and 172b a ninety degree face, it is to be understood that these values may be varied to suit the particular characteristics of the valve mechanism used.

Although the apparatus has been disclosed particularly for the purpose of weighing liquids, it may be used for weighing grain and other fluent solids, by merely making minor changes in the valve to handle these classes of materials, and the appended claims are intended to embrace the invention when it is put to such use.

From the foregoing disclosure, it is apparent that I have provided a novel multi-tank weighing apparatus in which: the weighing operations are accurately coordinated with each other and occur in predetermined sequence to automatically carry out weighing operations in the tanks alternately; each tank assembly embodies a novel traveling poise mechanism for accurately weighing the overdraft and then discharging the entire tank; each poise embodies a counter mechanism for recording half of the overdraft on the way out and half on the way back, and novel mechanism is provided for operating the inlet and discharge valves for the tanks and also novel means for coordinating their operation, to effect alternate weighing operations to be carried out in the two tanks.

What I claim is:

1. In a weighing apparatus, a tank supported by a weighing mechanism comprising main and auxiliary beams, a poise on said auxiliary beam, inlet and discharge valves for feeding liquid to and from said tank, a cam shaft mounted for rotation in cooperative relationship to said tank and operative to close and open said valves in various angular positions, a motor for rotating said shaft, an electric circuit automatically closed by raising of said main beam for rotating said shaft and closing said inlet valve, means for causing the poise to travel out on said auxiliary beam, said electric circuit being controlled by a cam on said shaft to automatically stop the latter when the inlet valve has been closed, a second circuit automatically controlled by depression of said main beam for causing said poise to stop at balance and return to zero, and means controlled by a second cam on said shaft for rotating said shaft sufficiently to open said discharge valve, and for causing said shaft to be stopped by said motor when said discharge valve is open.

2. The weighing apparatus defined in claim 1, wherein said means for causing said poise to travel out on said auxiliary beam comprises a third cam on said shaft adapted to close a third circuit, substantially when said first cam is breaking said first circuit, for energizing a second motor, supported on said auxiliary beam, and operatively connected to said poise.

3. The weighing apparatus defined in claim 1, wherein said auxiliary poise is actuated by an electric motor and is operative to automatically open the motor circuit when it returns to zero.

4. In a weighing apparatus, a primary weigh tank and a secondary weigh tank supported by weigh beams, means for feeding liquid to said tanks, including an inlet valve associated with each tank, and means for automatically closing one valve and, simultaneously, opening the other when a quantity of liquid slightly in excess of a predetermined weight has been fed into one of said tanks, said means for operating said valves comprising a shaft, means for rotating said shaft in one direction only, said shaft carrying a crank and connected to said valves by lost motion means operable to effect opening of one valve and closing of the other valve for ninety degree travel of said shaft, and to allow said valves to remain stationary for the succeeding ninety degree travel of said shaft.

5. In a weighing apparatus, a first weigh tank and a second weigh tank, weigh mechanism supporting said tanks comprising first and second weigh beams, fluid inlet valves for said tanks, means automatically operable upon elevation of said first beam for closing the inlet valve for said first tank and substantially, simultaneously opening the inlet valve for said second tank, and means for balancing any overdraft that may be present in said first tank as a result of the filling operation, and means for automatically discharging the material from said first tank upon balance of said overdraft.

6. The weighing apparatus defined in claim 5, together with means for automatically closing the inlet valve for said second tank upon elevation of said second weigh beam and substantially, simultaneously opening the inlet valve for said first tank.

7. In a weighing apparatus, a weigh tank having inlet and outlet valves and supported by weighing mechanism comprising a main beam and poise and a second beam and auxilary poise, a shaft rotatable by power means and having cam means for opening and closing said inlet and discharge valves in predetermined sequence, means automatically operable in response to overbalancing of said main beam for closing a circuit through said power means and rotating said shaft to close said inlet valve, means controlled by a cam on said shaft for breaking said circuit when said inlet valve is closed, a second cam on said shaft, automatically operable to close a second circuit just before said first circuit is broken, a second power means controlled by said second circuit for moving said auxiliary poise out on its beam, circuit means automatically operable upon balancing of said main beam by said auxiliary poise for reversing said second power means and returning said auxiliary poise to zero and, simultaneously, energizing said first power means to rotate said shaft sufficiently to open said outlet valve.

8. The weighing apparatus defined in claim 7, wherein said circuit means comprises means for automatically de-energizing said second power means when said poise has been returned to zero, and said shaft carries a further cam for automatically de-energizing said first power means when said outlet valve has been opened.

9. In a weighing apparatus, a first tank and a second tank, each supported by weighing mechanism having a main and auxiliary weigh beam and poise and each having an inlet valve and an outlet valve, means for automatically closing said first inlet valve and opening said second inlet valve when a quantity of material slightly in excess of the weight indicated by said first poise has been fed into said first tank, means for automatically moving said first auxiliary poise out on its beam, means for automatically stopping and reversing the travel of said poise when the excess material has been balanced and substantially, simultaneously opening said first outlet valve, means for automatically closing said second inlet valve and said first outlet valve and opening said first inlet valve when a quantity of material slightly in excess of the weight indicated by said second main beam poise is fed into said second tank, means for automatically moving said second auxiliary poise out on its beam, and means for automatically stopping and reversing the direction of travel of said poise when the excess material has been balanced and substantially, simultaneously opening said second outlet valve.

PHILIP B. RICHARDSON.